United States Patent
Pettigrew et al.

(10) Patent No.: US 8,352,641 B2
(45) Date of Patent: Jan. 8, 2013

(54) SYSTEMS AND METHODS FOR IDENTIFYING FIELDBUS DEVICES IN A CONTROL SYSTEM

(75) Inventors: William Robert Pettigrew, Blacksburg, VA (US); Dana Robert Kreft, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 12/764,461

(22) Filed: Apr. 21, 2010

(65) Prior Publication Data

US 2011/0264244 A1 Oct. 27, 2011

(51) Int. Cl.
*G06F 3/00* (2006.01)
(52) U.S. Cl. .................. 710/15; 710/17; 710/19
(58) Field of Classification Search .............. 710/15, 710/17, 19
See application file for complete search history.

(56) References Cited

U.S. PATENT DOCUMENTS

| | | | |
|---|---|---|---|
| 5,922,056 A * | 7/1999 | Amell et al. ............ | 710/16 |
| 5,980,078 A | 11/1999 | Krivoshein et al. | |
| 6,111,505 A * | 8/2000 | Wagener ............. | 340/568.1 |
| 6,119,122 A | 9/2000 | Bunnell | |
| 6,687,698 B1 * | 2/2004 | Nixon et al. .......... | 1/1 |
| 2005/0066104 A1 * | 3/2005 | Train et al. .......... | 710/305 |
| 2005/0220007 A1 * | 10/2005 | Prigent et al. ........ | 370/217 |
| 2008/0249641 A1 * | 10/2008 | Enver et al. ............ | 700/9 |

\* cited by examiner

*Primary Examiner* — Chun-Kuan Lee
*Assistant Examiner* — Farley Abad
(74) *Attorney, Agent, or Firm* — Sutherland Asbill & Brennan LLP (57) ABSTRACT

Systems and methods for identifying one or more Fieldbus devices in a control system are described. One or more messages from respective linking devices and including information associated with a plurality of segments for the linking devices may be received and analyzed to identify one or more segments to which at least one Fieldbus device is connected. A respective query message requesting information associated with connected Fieldbus devices may then be generated and communicated to each identified segment. One or more responses to the query messages may be received and utilized to prepare a listing of the Fieldbus devices that are included in or connected in the control system.

20 Claims, 4 Drawing Sheets

SYSTEMS AND METHODS FOR IDENTIFYING FIELDBUS DEVICES IN A CONTROL SYSTEM

FIELD OF THE INVENTION

Embodiments of the invention relate generally to control systems and more specifically to the identification of Fieldbus devices in a control system.

BACKGROUND OF THE INVENTION

Control systems are utilized in a wide variety of different applications. For example, control systems are utilized in conjunction with power generating devices, in power plants, and/or in process plants. A control system typically includes a central controller in communication with other components of the control system, for example, sensors, measurement devices, valves, etc. The central controller typically communicates with the other components via suitable network communications. The central control also typically communicates with one or more workstations or configuration computers that provide a human machine interface to operators of the control system.

With the development and adoption of the Foundation Fieldbus standard, Fieldbus devices have been incorporated into control systems. These Fieldbus devices are typically connected to the central controller via suitable linking devices. In order to assign the Fieldbus devices and/or run various diagnostics on the devices, an operator utilizing a configuration computer needs to be aware of the active Fieldbus devices that are connected in the control system. Accordingly, improved systems and methods for identifying Fieldbus devices in a control system would be desirable.

BRIEF DESCRIPTION OF THE INVENTION

Some or all of the above needs and/or problems may be addressed by certain embodiments of the invention. Embodiments of the invention may include systems and methods for identifying Fieldbus devices in a control system. According to one embodiment of the invention, there is disclosed a method for identifying one or more Fieldbus devices. One or more messages from one or more respective linking devices may be received by a controller that includes one or more computers. Each of the one or more messages may include information associated with a plurality of segments for the respective linking device. Each of the plurality of segments may form or establish a communications channel to which at least one Fieldbus device can be connected. Following receipt, each of the one or more messages may be analyzed to identify one or more of the plurality of segments for each respective linking device to which at least one Fieldbus device is connected. A respective query message requesting information associated with the at least one Fieldbus device connected to the segment may be generated and communicated to each of the identified one or more segments. In response to the one or more query messages, one or more respective responses may be received, each response including information associated with one or more Fieldbus devices connected to the segment. Based upon the one or more respective responses, a listing of Fieldbus devices included in the control system may be prepared.

According to another embodiment of the invention, there is disclosed a control system. The control system may include at least one memory and at least one processor. The at least one memory may be configured to store computer-executable instructions. The at least one processor may be configured to access the at least one memory and execute the computer-executable instructions to: receive one or more messages from one or more respective linking devices, wherein each of the one or more messages comprises information associated with a plurality of segments for the respective linking device, wherein each of the plurality of segments comprises a communications channel to which one or more Fieldbus devices can be connected; analyze each of the one or more received messages to identify one or more of the plurality of segments for each respective linking device to which at least one Fieldbus device is connected; generate, for each of the identified one or more segments, a respective query message requesting information associated with the at least one Fieldbus device connected to the segment; communicate, to each of the identified one or more segments, the respective query message; receive, in response to the one or more query messages, one or more respective responses, each response comprising information associated with one or more Fieldbus devices connected to the segment; and prepare, based upon the one or more respective responses, a listing of Fieldbus devices included in the control system.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for identifying Fieldbus devices that are connected in a control system. A controller associated with the control system, such as a control system including one or more suitable computers, may be configured to dynamically identify the connected Fieldbus devices. For example, the controller may receive one or more messages, such as annunciation messages, from one or more respective Fieldbus linking devices. Each received message may include information associated with a plurality of segments for the respective linking device. Each of these segments may provide a communications channel to which Fieldbus devices may be connected to the linking device. The controller may analyze or parse each received message in order to identify one or more of the active segments for each linking device to which at least one Fieldbus device is connected. The controller may then generate a respective query message for each identified active segment in order to request information associated with the one or more Fieldbus devices connected to the segment. In response to communicating the query messages to the active segments, the controller may receive any number of responses that include information associated with the connected Fieldbus devices. As the desired, the controller may then generate and communicate respective device query messages to any number of the connected Fieldbus devices in order to obtain more detailed information for the Fieldbus devices. Once information is collected by the controller, the controller may prepare one or more lists of the Fieldbus devices connected in the control system and/or various graphical presentations associated with the connected Fieldbus devices. The prepared lists and/or presentations may then be transmitted to any number of suitable recipients, such as a workstation computer utilized by an operator of the control system.

According to an aspect of the invention, the controller may dynamically maintain a list of connected Fieldbus devices. The controller may identify changes in a list of connected Fieldbus devices and dynamically update the list based upon the identified changes. Updates may then be communicated to a recipient by the controller. For example, the controller may identify differences between annunciation messages received from various linking devices and stored information associated with previously received annunciation messages. As explained in greater detail below, the controller may utilize these identified differences in order to determine whether linking devices, segments, and/or Fieldbus devices have been disconnected from the control system and/or whether new devices have been connected.

Various embodiments of the invention may include one or more special purpose computers, systems, and/or particular machines that facilitate the dynamic identification of Fieldbus devices that are connected and/or active within a control system. A special purpose computer or particular machine may include a wide variety of different software modules as desired in various embodiments. As explained in greater detail below, in certain embodiments, these various software components may be utilized to collect information associated with connected Fieldbus devices and to dynamically generate lists and/or various presentations associated with the collected Fieldbus devices.

Certain embodiments of the invention described herein may have the technical effect of facilitating the dynamic identification of Fieldbus devices that are connected to and/or within a control system. Additionally, certain embodiments of the invention may have the technical effect of providing an operator of the control system with a relatively accurate list or view of the connected Fieldbus devices. In this regard, the operator may accurately assign the Fieldbus devices and/or perform various diagnostic analysis on the devices.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include but are not limited to sensors, gauges, measurement devices, valves, actuators, input/output subsystems, host systems, linking devices, any suitable Fieldbus H1 devices, and/or any suitable Fieldbus high-speed Ethernet (HSE) devices. In certain embodiments, H1 devices may operate and/or communicate at a different rate than HSE devices. As one example, H1 devices may operate at approximately 31.25 kilobits per second, and HSE devices may operate at approximately 100 megabits per second. As desired, various HSE devices, such as linking devices, may be utilized to interconnect H1 devices to a central controller of the control system. Additionally, the term HSE protocol may be utilized to refer to a Fieldbus protocol that facilitates communications with HSE Fieldbus devices.

Communications between Fieldbus devices and/or between one or more controllers and/or processors of the control system and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

Figure 1:
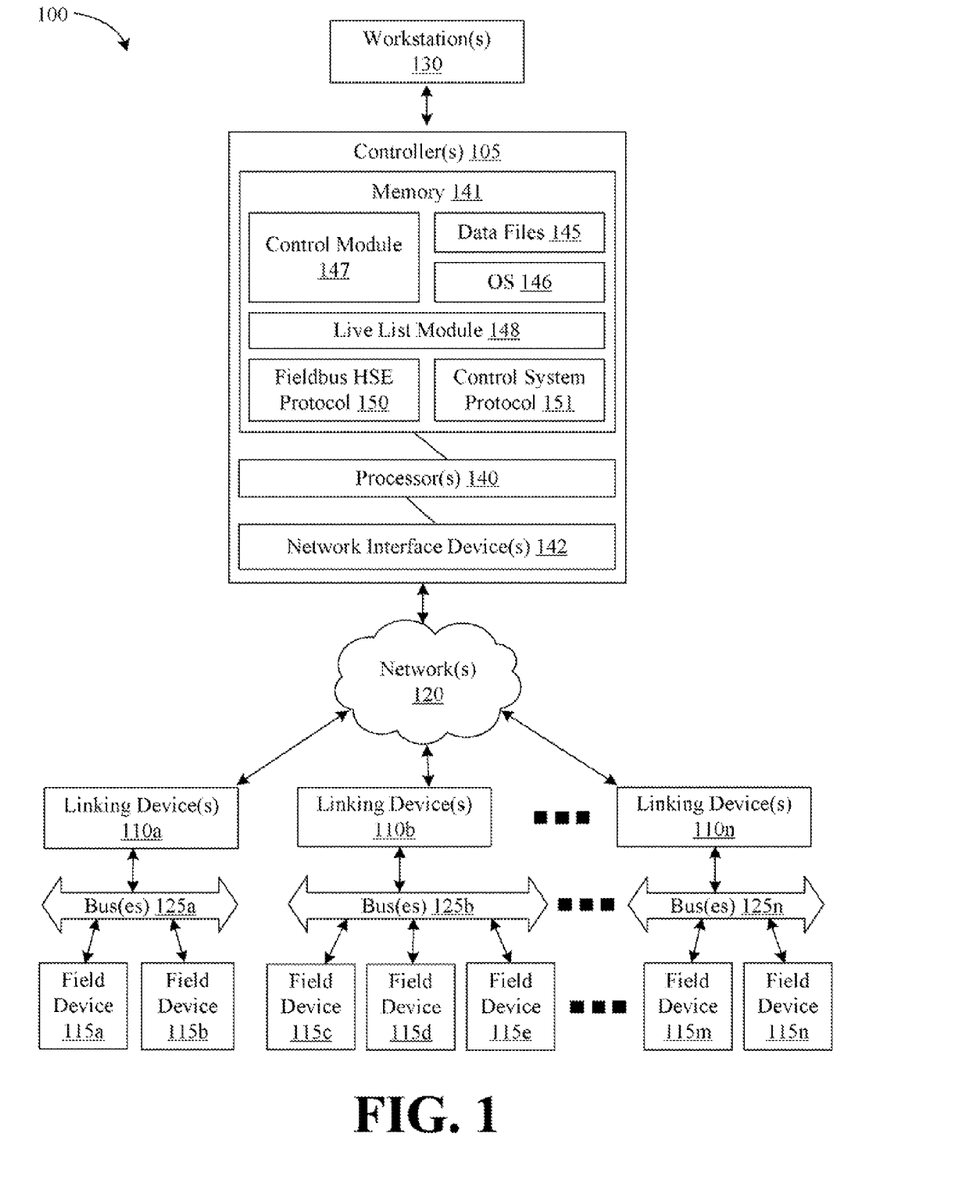
FIG. 1 is a schematic diagram of one example control system that may be utilized in accordance with various embodiments of the invention.

FIG. 1 is a block diagram of one example control system 100 that may be utilized in accordance with various embodiments of the invention. The control system 100 may include one or more controllers 105 (e.g., central controllers) and/or control devices, one or more linking devices 110*a-n*, and/or one or more Fieldbus devices 115*a-n*. The controller 105 may communicate with the linking devices 110*a-n* via one or more suitable networks 120 or communications buses. Additionally, the linking devices 110*a-n* may communicate with the various Fieldbus devices 115*a-n* via one or more suitable buses 125*a-n* or networks.

In certain embodiments of the invention, one or more workstations 130 may be provided. As desired, these workstations 130 may provide a human machine interface (HMI) between the control system 100 and one or more operators of the control system 100. For example, the workstations 130 may facilitate the receipt of user input and/or user commands associated with the operation of the control system 100. In other words, the workstations 130 may facilitate user interaction with the controller 105. Additionally, the workstations 130 may be configured to receive data from the controller 105, such as one or more lists and/or presentations associated with the connected Fieldbus devices 115*a-n*. The workstations 130 may further be configured to display at least a portion of the received data to a user via a suitable display device, such as a monitor.

The workstations 130 may include one or more suitable computers or computing devices, such as personal computers, hand-held computing devices, mini-computers, etc. Additionally, the workstations 130 may be in communication with the controller 105 via one or more suitable network connections, for example, a direct link or direct connection, a local area network, a wide area network, the Internet, a radio frequency (RF) network, a Bluetooth™ enabled network, any suitable wired network, or any suitable wireless network. In this regard, user commands, instructions, and/or other input associated with the operation of the control system 100 may be received by the workstations 130 and communicated to the controller 105. Additionally, output data associated with the operations of the control system 100 and/or a plant or other system monitored by the control system 100 may be communicated to the workstations 130 by the controller 105 for output and/or display to a user. As desired, a wide variety of communications protocols may be utilized to facilitate communications between the controller 105 and the workstations 130. For example, in certain embodiments, a propriety protocol associated with the control system may be utilized. As desired, specific commands within the proprietary protocol may be utilized to facilitate a request for information associated with connected Fieldbus devices 115a-n and/or the receipt of the information associated with connected Fieldbus devices 115a-n.

With continued reference to FIG. 1, any number of linking devices 110a-n may be utilized in association with the control system 100. The linking devices 110a-n may be devices that are capable of communicating via a Fieldbus network or bus and via one or more relatively higher speed networks that facilitate communications with the controller 105. For example, a linking device (generally referred to as linking device 110) may be a HSE Fieldbus device or a combination HSE/H1 device. As such, the linking device 110 may be capable of communicating with the controller 105 via a suitable Ethernet network or other suitable network. Additionally, the linking device 110 may be capable of communicating with connected Fieldbus devices 115a-n via one or more Fieldbus networks and/or data buses. As desired, the linking devices 110a-n may facilitate communication between the controller 105 and the Fieldbus devices 115a-n.

A linking device 110 may include any number of segments and/or connections to which a Fieldbus data bus 125 or local Fieldbus network may be connected. For example, in certain embodiments, a linking device 110 may include four (4) segments, although any other number of segments may be included as desired. Each segment may establish a separate communications channel and be configured to facilitate communications between the linking device 110 and the Fieldbus devices connected to the segment.

In operation, a linking device 110 may be configured to transmit or communicate an annunciation message or status message to the controller 105. In certain embodiments, an annunciation message may be periodically communicated. The period for the communications may be a default time period or a period that is established by one or more user preferences. Additionally, a wide variety of suitable time periods may be utilized as desired, such as a period of approximately one (1) second, a period of approximately two (2) seconds, etc. In other embodiments, an annunciation message may be communicated to a controller 105 in response to a request for the annunciation message. According to an aspect of the invention, an annunciation message may include information associated with the segments of the linking device 110, which segments have connected Fieldbus devices, and/or various information associated with the connected Fieldbus devices. In one embodiments, the annunciation message may include a version number for each segment, and the version number may include status information for the segment, such as an indication of whether the segment is active, an indication of the number of Fieldbus devices connected to the segment, etc.

In certain embodiments, the linking device 110 may additionally be configured to respond to received requests for additional information associated with a segment of the linking device 110. For example, the controller 105 may utilize a received annunciation message to identify a segment of the linking device 110 for which more information is sought, and the controller 105 may communicate a query message to the linking device 110 in order to request additional information associated with the segment. A segment query message may request a wide variety of different information as desired in various embodiments, such as device identifiers for the Fieldbus devices connected to the segment. In response to a received query message, the linking device 110 may communicate a response to the controller 105 with information associated with the segment, such as device identifiers for Fieldbus devices connected to the segment, etc.

With continued reference to FIG. 1, any number of Fieldbus devices 115a-n may be utilized in association with the control system 100. In certain embodiments, each Fieldbus device (generally referred to as device 115) may be in communication with a linking device 110 via a local Fieldbus network or data bus 125. In this regard, communications between the Fieldbus device 115 and the controller 105 may be facilitated by the linking device 110. A wide variety of different types of Fieldbus devices may be utilized as desired in various embodiments of the invention, including any number of H1 Fieldbus devices and/or other suitable devices. In certain embodiments, the Fieldbus devices 115a-n may be distributed or situated at varying points within a power plant or process plant. In this regard, the Fieldbus devices 115a-n may be utilized to monitor and/or control various aspects and/or operations of a plant.

Additionally, in certain embodiments, a Fieldbus device 115 may be operable or configured to respond to received requests for additional information associated with the Fieldbus device 115. For example, the controller 105 may utilize a received response to a segment query message to identify a Fieldbus device 115 for which more information is sought, and the controller 105 may communicate a device query message to the Fieldbus device 115 in order to request additional information associated with the device 115. A device query message may request a wide variety of different information as desired in various embodiments, such as a device identifier, a user tag for the device 115, a manufacturer identifier, a device type, a device revision identifier, a device description revision, one or more function block revisions, and/or any other suitable information. In response to a received device query message, the Fieldbus device 115 may communicate a response to the controller 105 via the linking device 110 that includes information associated with the Fieldbus device 115.

In certain embodiments, communications between the linking devices 110a-n and the Fieldbus devices 115a-n may be facilitated using the Fieldbus protocol. Additionally, communications between the linking devices 110a-n and the controller 105 may be facilitated using the Fieldbus protocol.

The one or more networks 120 may include any suitable network or combination of networks that facilitate communications between the linking devices 110a-n and the controller 105. Similarly, the Fieldbus data buses 125a-n or networks may include any number of suitable data buses and/or local area networks that facilitate communication between a linking device 110 and Fieldbus devices that are connected to the linking device 110. Examples of suitable networks and/or data buses include, but are not limited to, a local area network, a wide area network, the Internet, a radio frequency (RF) network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within the network 120. Each of the Ethernet switches may include hardware and/or software components that are operable to facilitate the routing of data within the network 120. Examples of suitable Ethernet switches include, but are not limited to, network bridges, multilayer switches, etc.

As desired in various embodiments of the invention, redundant components may be provided within the network 120 and/or the system 100. For example, redundant wiring, switches, and/or routers may be provided. Additionally, in certain embodiments redundant linking devices 110*a-n* and/or segments may be provided. In this regard, adequate operations may be maintained within the control system 100 in the event of failure of network device.

With continued reference to FIG. 1, the control system 100 may include a controller 105, such as a central controller. Some examples of suitable controllers are a Mark™ VI control system and a Mark™ Vie control system produced by the General Electric Company. The controller 105 may be configured to communicate with and/or control other components of the control system 100 and/or components of the plant or system that is controlled by the control system 100. Additionally, the controller 105 may be configured to dynamically identify the Fieldbus devices 115*a-n* that are connected within the control system 100.

The controller 105 may include any number of processor driven devices that control the operations of the control system 100. For example, the controller 105 may include any number of special purpose computers or particular machines, application specific circuits, programmable logic controllers (PLC), microcontrollers, personal computers, minicomputers, mainframe computers, supercomputers, and the like. In certain embodiments, the operations of the controller 105 may be controlled by computer-executed or computer-implemented instructions that are executed by one or more processors associated with the controller 105. The instructions may be embodied in one or more software components as desired in various embodiments of the invention. The execution of the instructions may form a special purpose computer or other particular machine that is operable to control the operations of the control system 100 and/or to dynamically identify connected Fieldbus devices 115*a-n*. The one or more processors that control the operations of the controller 105 may be incorporated into the controller 105 and/or in communication with the controller 105 via one or more suitable networks. In certain embodiments of the invention, the operations and/or control of the controller 105 may be distributed amongst several processing components.

The controller 105 may include one or more processors 140, one or more memory devices 141, and one or more network interface device(s) 142. The one or more memory devices 141 may be any suitable memory devices, for example, caches, read only memory devices, random access memory devices, magnetic storage devices, etc. The one or more memory devices 141 may store data, executable instructions, and/or various program modules utilized by the controller 105, for example, data 145 associated with the operation of the control system, an operating system 146, a control module 147, and a live list module 148. Additionally, the memory 141 may be operable to store both a Fieldbus or HSE protocol 150 and a second control system protocol 151 that facilitates communication with other components of the control system 100. The data 145 may include any suitable data associated with the operation of the control system 100 and/or the operation of the plant or system monitored by the control system 100, for example, measurements data, operating data, etc. The operating system (OS) 146 may include executable instructions and/or program modules that facilitate and/or control the general operation of the central controller 105. For example, the OS 146 may facilitate the execution of other software programs and/or program modules by the processors 140.

The control module 147 may be operable to monitor and/or control the overall operations of the control system 100 and/or the plant or system that is monitored and/or controlled by the control system 100. In doing so, the control module 147 may utilize various measurements and/or other data associated with the operation of the control system 100 and/or the monitored plant or system. At least a portion of the utilized data may be received from the Fieldbus devices 115*a-n* via the linking devices 110*a-n*. The control module 147 may be further operable to generate command signals associated with the operation of the control system 100 and to direct the communication of the generated Signals to other components of the control system 100, for example, to the Fieldbus devices 115*a-n*.

As desired, a communications module may be associated with the controller 105 and operable to format and/or generate communications to be transmitted over the network 120. Additionally, the communications module may be operable to receive communications that have been transmitted to the central controller 105 and to extract data from the received communications. The communications module may utilize both the Fieldbus or HSE protocol 150 and/or one or more other protocols, such as the control system or second protocol 151, during the formatting of communications.

The live list module 148 may be operable to dynamically generate and/or maintain a list of linking devices 110*a-n*, segments, and/or Fieldbus devices 115*a-n* that are connected within the control system 100. In certain embodiments, the live list module 148 may be operable to generate and/or update a list of devices based upon the receipt of respective annunciation messages or status messages from various linking devices 110*a-n* and the evaluation of the received messages. For example, newly connected and/or disconnected devices may be identified by comparing a received annunciation message to a previously received annunciation message. In this regard, a list of connected devices maintained in near real time in certain embodiments of the invention. An example of the operations that may be performed by the live list module 148 to generate a list of connected Fieldbus devices 115*a-n* and to dynamically maintain and/or update the list is set forth in greater detail below with reference to FIGS. 2 and 3. In addition to generating and/or maintaining a list of connected devices, the live list module 148 may generate a wide variety of presentations, such as graphical displays and/or graphical user interfaces, associated with connected devices. As desired, the live list module may direct the communication of generated lists and/or presentations to one or more recipient devices, such as the workstations 130 for display to an operator of the control system 100.

With continued reference to FIG. 1, the network interface devices 144 may facilitate connection of the controller 105 to the network 120 and/or to the workstations 130. The network interface devices 144 may include any number of input/output cards (e.g., Ethernet cards) and/or other devices that facilitate network communications.

As desired, embodiments of the invention may include a control system 100 with more or less than the components illustrated in FIG. 1. The control system 100 of FIG. 1 is provided by way of example only.

Figure 2:
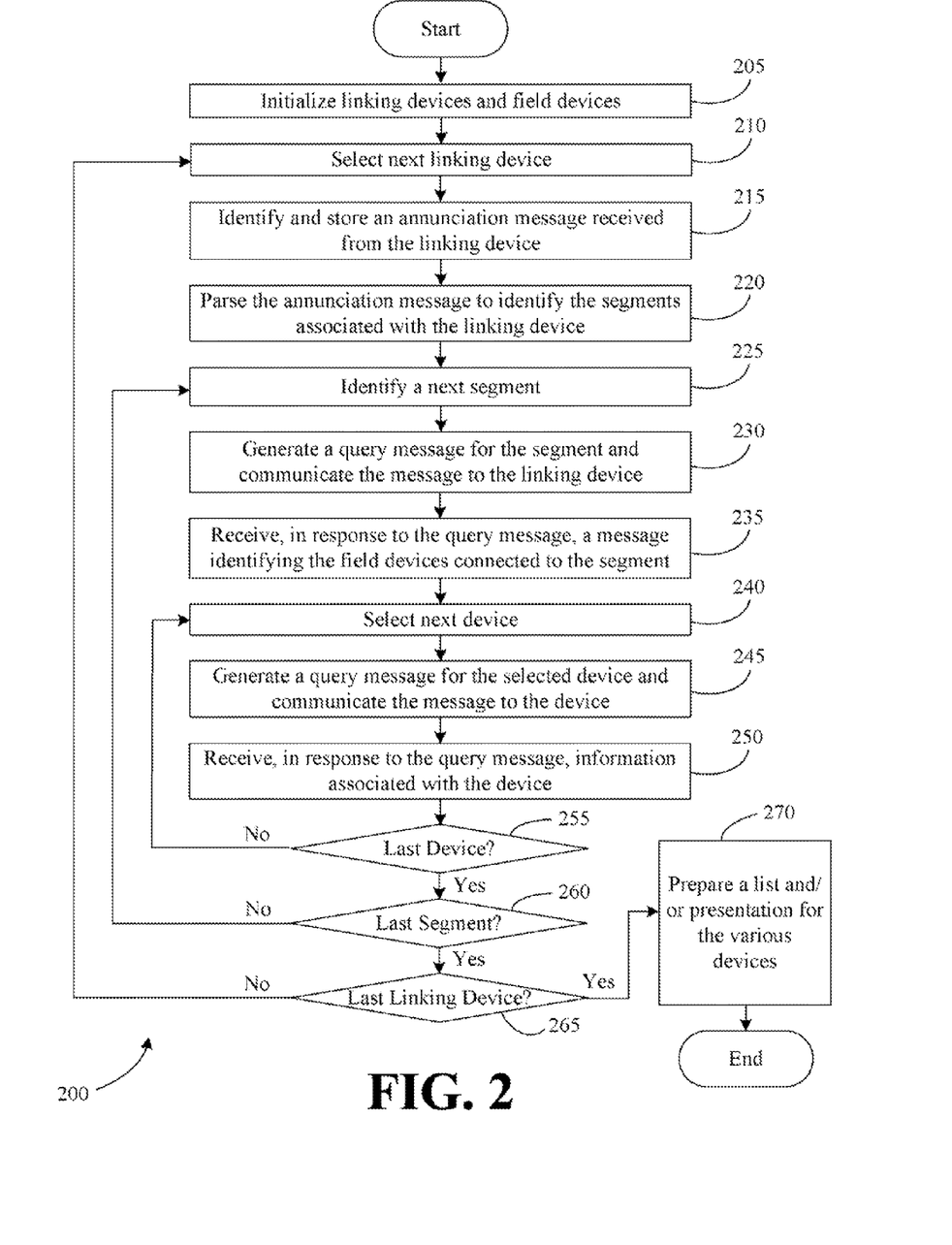
FIG. 2 is a flow chart of one example method for identifying Fieldbus devices within a control system, according to an illustrative embodiment of the invention.

FIG. 2 is a flow chart of one example method 200 for identifying Fieldbus devices within a control system, according to an illustrative embodiment of the invention. The method 200 may be performed by a suitable controller associated with a control system, such as the controller 105 associated with the control system 100 of FIG. 1. The method may begin at block 205.

At block 205, one or more linking devices and/or associated Fieldbus devices, such as the linking devices 110a-n and Fieldbus devices 115a-n may be connected to a control system 100 and/or initialized. For example, any number of Fieldbus devices 115a-n, such as H1 devices, may be connected to a linking device 110 via suitable Fieldbus data bus and/or other suitable network connections. The linking device 110, which may be a suitable H1/HSE device, may then be connected to a central controller 105 of the control system 100 via any number of suitable network connections. Once the linking devices 110a-n have been connected to the controller 105, each linking device 110a-n may periodically communicate an annunciation or status message to the controller 105. As desired, the time period for communicating an annunciation message may be established by various user parameters and a wide variety of timer periods may be utilized in accordance with various embodiments of the invention. These messages may be utilized to generate and/or dynamically update a list of linking devices 110a-n and Fieldbus devices 115a-n that are connected to the controller 105.

At block 210, a next linking device 110 may be selected from a group of one or more linking devices 110a-n that are connected to the controller 105. For example, the next linking device 110 may be selected from a group of one or more linking devices 110a-n that have communicated a respective annunciation message to the controller 105. At block 215, an annunciation message received from the selected linking device 110 may be identified. In certain embodiments, the identified annunciation message may be stored for subsequent use in detecting changes in a list of connected Fieldbus devices 115a-n, as described in greater detail below with reference to FIG. 3.

The received annunciation message for the selected linking devices 110 may include a wide variety of information associated with one or more segments for the linking device 110. Each segment may be a branch or communications branch of the linking device 110 that facilitates communication between the linking device 110 and any number of Fieldbus devices 115a-n. For example, each segment may be connected to a Fieldbus data bus or local network that facilitates communication between the linking device 110 and various Fieldbus devices 115a-n. In certain embodiments, a linking device 110 may include four segments, although linking devices may be provided with any number of segments. The annunciation message may include a wide variety of information associated with the linking device segments. For example, the annunciation message may include a version number or other identifier for each segment. In certain embodiments, the version number may identify the segment, an indication of whether the segment is in use, an indication of whether any Fieldbus devices are connected to the segment, a number of connected Fieldbus devices, and/or other information as desired.

At block 220, the received annunciation message may be parsed or otherwise analyzed in order to identify the active segments associated with the linking device 110. Each identified segment may then be analyzed in order to identify or determine the respective Fieldbus devices that are connected to the segment. At block 225, a next segment for the selected linking device 110 may be identified and selected. A query message may then be generated for the selected segment at block 230. The generated query message may request information associated with Fieldbus devices 115a-n that are connected to the segment. A wide variety of information may be requested as desired in various embodiments of the invention, such as identifiers and/or version numbers for the Fieldbus devices 115a-n. Alternatively, the query message may request a standardized status message for the segment that includes information associated with the Fieldbus devices connected to the segment. Once generated, the query message may be communicated to the segment.

At block 235, a response to the query message may be received. The response may include a message identifying the Fieldbus devices 115a-n that are connected to the segment. In certain embodiments, the response may include identifying information for the segment, identifiers for each connected Fieldbus device 115, an indication of whether the Fieldbus device 115 is active, and/or any other suitable information associated with the Fieldbus device 115. As desired, the received message may be parsed or otherwise analyzed in order to identify the one or more Fieldbus devices 115a-n connected to the segment. Each identified Fieldbus device 115 may then be analyzed in order to obtain additional information associated with the Fieldbus device 115.

At block 240, a next Fieldbus device 115 may be identified and/or selected. A device query message may then be generated for the selected Fieldbus device 115 at block 245. The generated device query message may request a wide variety of information for the Fieldbus device 115 as desired in various embodiments, including but not limited to, a device identifier, a user tag for the device 115, a manufacturer identifier, a device type, a device revision identifier, a device description revision, one or more function block revisions, and/or any other suitable information. Once generated, the device query message may be transmitted or otherwise communicated to the Fieldbus device 115. For example, the device query message may be communicated to the linking device 110, and the linking device 110 may communicate the device query message to the Fieldbus device 115.

At block 250, a response to the device query message may be received. The received response message may be generated by the Fieldbus device 115 and may include a wide variety of information associated with the Fieldbus device 115, such as a portion or all of the information described above with reference to block 245. In this regard, accurate information associated with the Fieldbus device 115 and/or its operation may be collected by the controller 105.

At block 255, a determination may be made as to whether the selected Fieldbus device 115 is the last Fieldbus device connected to the selected segment. If it is determined at block 255 that the Fieldbus device 115 is not the last device connected to the segment, then operations may continue at block 240 and a next Fieldbus device may be identified or selected for processing. In this regard, information associated with each Fieldbus device connected to the segment may be collected or otherwise obtained by the controller 105. If, however, it is determined at block 255 that the selected Fieldbus device 115 is the last Fieldbus device connected to the segment, then operations may continue at block 260.

At block 260, a determination may be made as to whether the selected segment is the last active segment for the selected linking device 110. If it is determined at block 260 that the segment is not the last segment, then operations may continue at block 225 and a next segment may be identified or selected for processing. In this regard, information associated with each segment of a linking device may be collected or otherwise obtained by the controller 105. If, however, it is determined at block 260 that the selected segment is the last segment of the linking device, then operations may continue at block 265.

At block 265, a determination may be made as to whether the selected linking device 110 is the last linking device connected to the controller 105. If it is determined at block 265 that the linking device 110 is not the last linking device, then operations may continue at block 210 and a next linking device may be identified or selected for processing. In this regard, information associated with each connected linking device 110a-n may be collected or otherwise obtained by the controller 105. If, however, it is determined at block 265 that the selected linking device 110 is the last linking device, then operations may continue at block 270.

At block 275, a list of the Fieldbus device 115a-n that are connected to and/or operative within the control system 100 may be prepared or generated. A wide variety of information may be included in a generated list, such as identifying information and/or operating information for each linking device 110a-n, segment, and/or Fieldbus device 115a-n. In certain embodiments, one or more presentations associated with the generated list, such as one or more graphical user interfaces, may be prepared or generated. A presentation may provide a visual representation of the connected Fieldbus devices 115a-n and/or their operation. As desired, a presentation may be formatted utilizing a wide variety of different techniques and/or layouts. Once example presentation layout is described in greater detail below with reference to FIG. 4.

As desired, the generated list and/or presentations may be transmitted or otherwise communicated by the controller 105 to one or more recipients, such as to the one or more workstation computers 130 illustrated in FIG. 1. In certain embodiments, the generated list and/or presentations may be communicated in accordance with a protocol associated with the control system 100. In this regard, an operator of the control system 100 may be provided with information associated with the connected Fieldbus devices 115a-n. Accordingly, the operator may assign one or more of the Fieldbus devices 115a-n in a proper or correct manner. Additionally, the operator may conduct or perform any number of diagnostics on the Fieldbus devices 115a-n and/or determine whether the Fieldbus devices 115a-n are operating properly.

The method 200 may end following block 270.

Although the method 200 set forth in FIG. 2 describes an iterative method for processing linking devices and collecting information associated with various linking device segments and/or Fieldbus devices connected to the segments, in certain embodiments, one or more linking devices, segments, and/or Fieldbus devices may be processed in parallel. For example, query messages for multiple segments of a linking device may be generated and/or communicated in parallel. As another example, device query messages for multiple Fieldbus devices connected to a segment may be generated and/or communicated in parallel.

Figure 3:
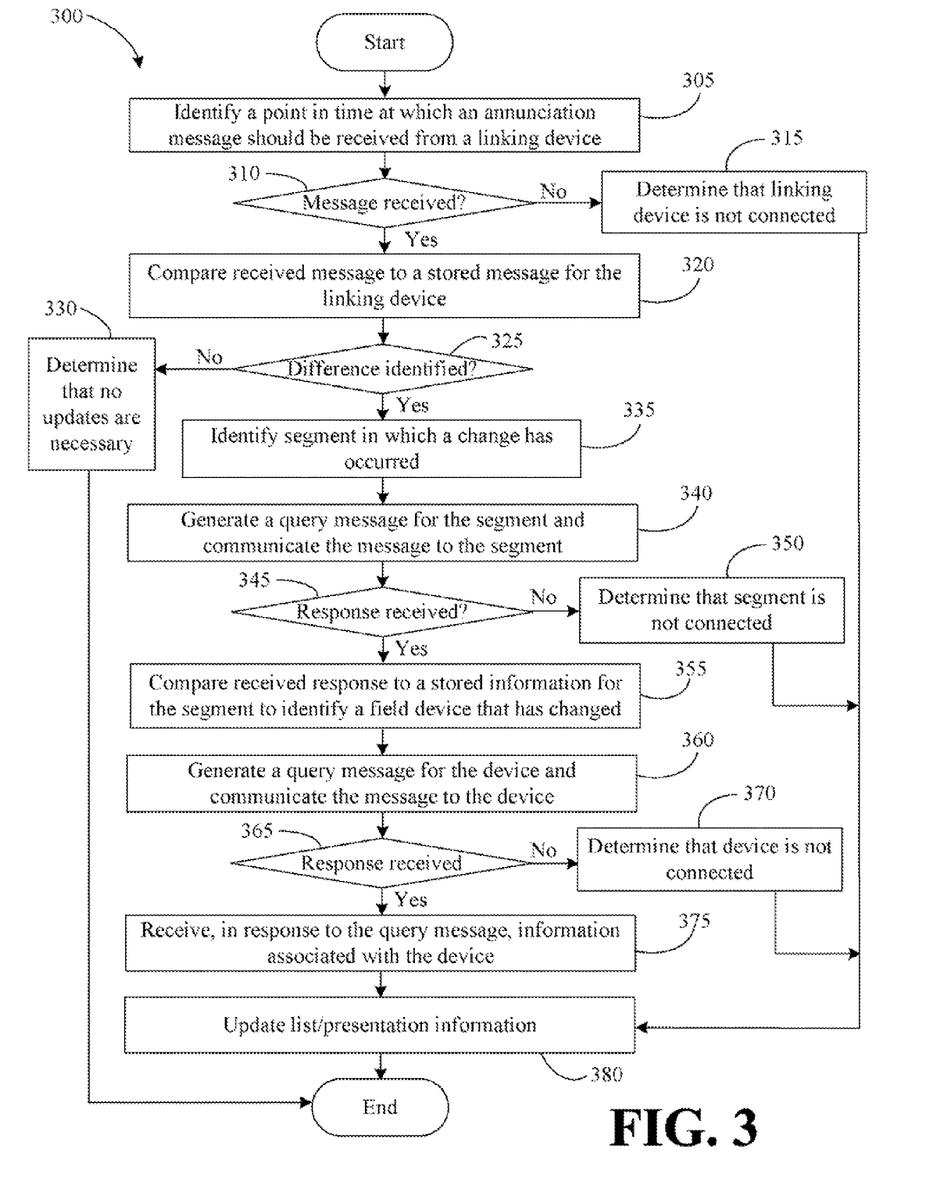
FIG. 3 is a flow chart of one example method for updating a list of Fieldbus devices within a control system, according to an illustrative embodiment of the invention.

FIG. 3 is a flow chart of one example method for updating a list of Fieldbus devices within a control system, according to an illustrative embodiment of the invention. The method 200 may be performed by a suitable controller associated with a control system, such as the controller 105 associated with the control system 100 FIG. 1. The method 300 may begin at block 305.

At block 305, a point in time at which an annunciation or status message should be received from a linking device 110 may be identified. In certain embodiments, a timing threshold for receiving annunciation messages that are periodically output from a linking device may be identified. Based upon the timing that a last annunciation message was received from the linking device 110 and the timing threshold, a point in time at which a subsequent annunciation message should be received may be determined. As desired, an identified point in time may permit for a certain amount of error in receiving an annunciation message, such as transmission delays, limited connectivity errors, and/or a failure of a linking device to output a message. In certain embodiments, a controller 105 may be alternatively configured to request an annunciation message from the linking device 110 and determine whether a response is received.

At block 310, a determination may be made as to whether an expected annunciation message has been received from the linking device 310. If it is determined at block 310 that an annunciation message has not been received, then operations may continue at block 315 and a determination may be made that the linking device 110 is no longer connected to the controller 105 and/or the control system 100. Operations may then continue at block 380 described in greater detail below and a list and/or presentations associated with the Fieldbus devices 115a-n connected to the control system 100 may be updated.

If, however, it is determined at block 310 that an annunciation message has been received from the linking device 310, then operations may continue at block 320. At block 320, information included in the received annunciation message may be compared to stored information for an annunciation message that was previously received from the linking device 110. Based upon the comparison, a determination may be made as to whether information associated with the segments of the linking device 110 has changed. For example, if there are differences between the received annunciation message and a stored annunciation, then it may be determined that information for one or more segments of the linking device 110 have changed. At block 325, a determination may be made as to whether there is a difference between the received annunciation message and stored information for a previously received annunciation message. If a difference is not identified at block 325, then operations may continue at block 330 and it may be determined that no updates to the list of Fieldbus devices connected to the linking device 110 is necessary. The method may end following block 330.

If, however, a difference is identified at block 325, then operations may continue at block 335. At block 335, a segment in which a change has occurred may be identified. For example, a version number for each segment may be compared to a respective stored version number for each segment. By identifying a difference between a version number received in the annunciation message and a respective stored version, a segment that has changed may be identified. Although block 335 describes the identification of a change within a single segment, a change may be identified in more than one segment in a similar manner. Additionally, a change in the version number or other information included in the annunciation message may be utilized to identify a newly activated segment associated with the linking device 110.

At block 340, a query message may be generated and communicated to the identified segment in a similar manner as that described above with reference to block 230 of FIG. 2. A determination may then be made at block 345 as to whether a response to the communicated query message is received. For example, a determination may be made as to whether a response is received within a timing threshold or predetermined period of time. If it is determined at block 345 that no response is received, then operations may continue at block 350 and a determination may be made that the segment is no longer active and/or connected to the controller 105 via the linking device 110. Operations may then continue at block 380 described in greater detail below and a list and/or presentations associated with the Fieldbus devices 115*a-n* connected to the control system 100 may be updated.

If, however, it is determined at block 345 that a response to the query message has been received, then operations may continue at block 355. At block 355, the received response may be compared to stored information associated with a previously received response for the segment, such as a response that is stored following block 250 of FIG. 2. Based upon the comparison at block 355, a Fieldbus device 115 in which a change has occurred may be identified. For example, a Fieldbus device 115 that has been changed may be identified by identifying a difference between a received query response and respective stored query response for the segment. Although block 355 describes the identification of a change within a single Fieldbus device, a change may be identified in more than one Fieldbus device in a similar manner. Additionally, a newly activated or connected Fieldbus device may be identified in a similar manner.

At block 360, a device query message for the identified Fieldbus device 115 may be generated and communicated to the Fieldbus device 115 in a similar manner as that set forth above with reference to block 245 of FIG. 2. A determination may then be made at block 365 as to whether a response to the communicated device query message is received. For example, a determination may be made as to whether a response is received within a timing threshold or predetermined period of time. If it is determined at block 365 that no response is received, then operations may continue at block 370 and a determination may be made that the Fieldbus device 115 is no longer active and/or connected to the controller 105 via the linking device 110. Operations may then continue at block 380 described in greater detail below and a list and/or presentations associated with the Fieldbus devices 115*a-n* connected to the control system 100 may be updated.

If, however, it is determined at block 365 that a response to the device query message has been received, then operations may continue at block 375. At block 375, the received response may be analyzed and/or otherwise utilized to identify information associated with the Fieldbus device 115. In this regard, changes in the operation of the Fieldbus device 115 may be identified. Operations may then continue at block 380.

At block 380, a list and/or presentations associated with the Fieldbus devices 115*a-n* connected to the control system 100 may be updated. For example, newly connected Fieldbus devices and/or newly disconnected Fieldbus devices may be identified. In the event that a linking device or segment is identified as being disconnected (and no redundant linking devices and/or segments are available), a determination may be made that each of the Fieldbus devices connected to the linking device or segment is no longer connected. Additionally, changes in the operations of one or more Fieldbus devices may be identified. Based upon identified changes, a list and/or presentations of Fieldbus devices, such as the list initially generated at block 270 of FIG. 2, may be updated or revised. In this regard, a relatively accurate list of connected Fieldbus devices may be dynamically maintained.

As desired, an updated list and/or presentations may be communicated to one or more recipients, such as the workstation computers 130 illustrated in FIG. 1. In certain embodiments, updated information may be communicated to a recipient when a change is identified. In other embodiments, and indication that change has occurred may be communicated to a recipient, and updated information may subsequently be communicated to the recipient based upon a received request for the updated information. In still other embodiments, updated information may be periodically communicated to a recipient or communicated based upon the receipt of a request for updated information.

The method 300 may end following either block 315, 330, 350, or 370.

Although the method 300 of FIG. 3 describes operations with respect to a single linking device 110, similar operations may be performed as desired for other linking devices 110*a-n* connected to the controller 105. In this regard, a list of Fieldbus devices 115*a-n* that are connected to the controller 105 may be dynamically determined and updated. Additionally, in certain embodiments, an annunciation message may be received from a new linking device, and a list of segments and Fieldbus devices associated with the linking device may be determined and utilized to update a previously generate list of linking devices 115*a-n* associated connected within the control system 100.

The operations described in the methods 200, 300 of FIGS. 2 and 3 do not necessarily have to be performed in the order set forth in FIGS. 2 and 3, but instead may be performed in any suitable order. Additionally, in certain embodiments of the invention, more or less than all of the elements or operations set forth in FIGS. 2 and 3 may be performed.

Figure 4:
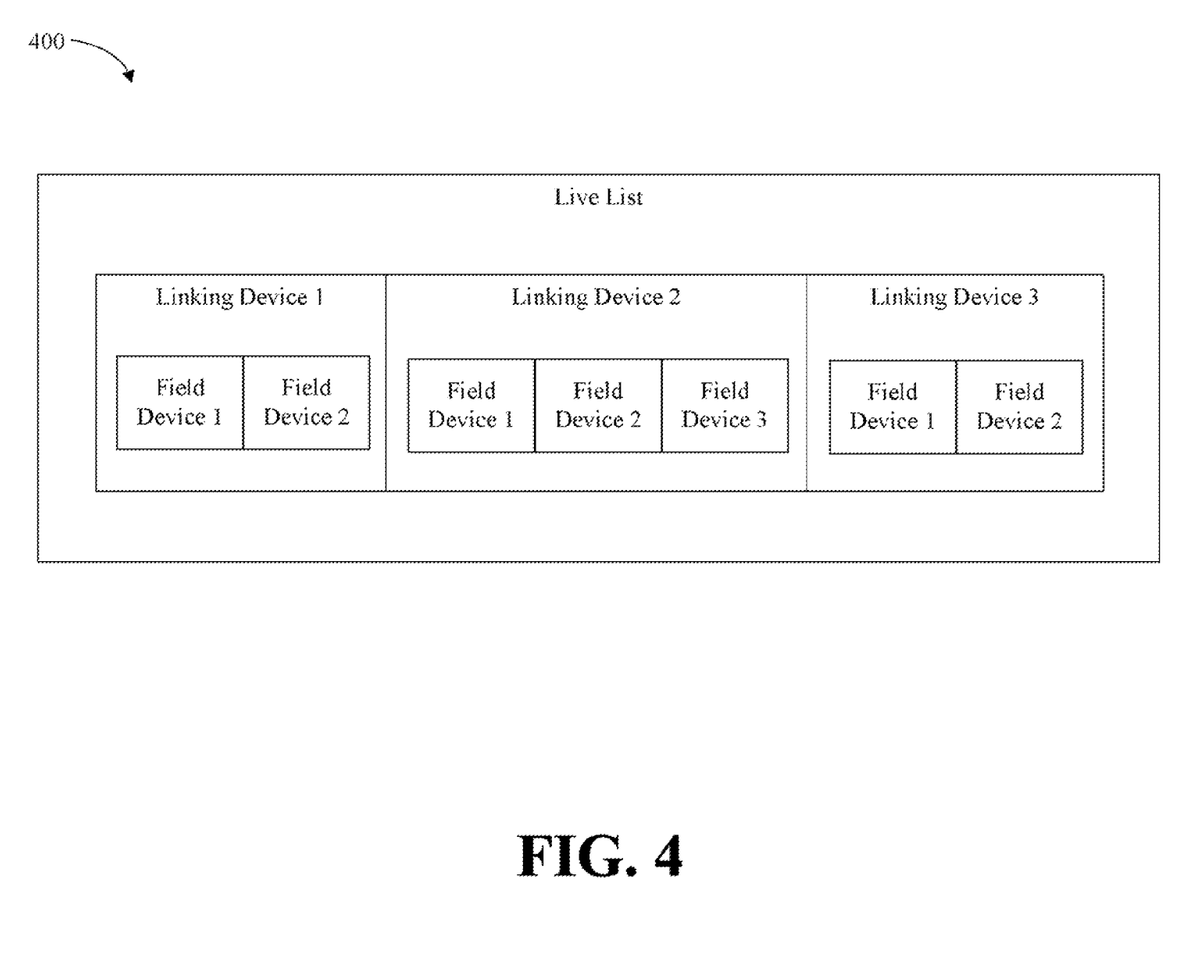
FIG. 4 is an illustration of one example presentation of connected Fieldbus devices that may be generated in accordance with various embodiments of the invention.

FIG. 4 is an illustration of one example presentation 400 of connected Fieldbus devices that may be generated in accordance with various embodiments of the invention. As illustrated in FIG. 4, a generated presentation 400 may be a live list or dynamically generated list or graphical presentation that illustrates the linking devices 110*a-n*, segments, and/or Fieldbus devices 115*a-n* that are connected to a controller 105 and/or connected within a control system 100.

With reference to FIG. 4, the example presentation 400 illustrates three linking devices that are connected to a controller 105. Two Fieldbus devices are connected to the first linking device, three Fieldbus devices are connected to the second linking device, and three Fieldbus devices are connected to the third linking devices. By utilizing the example presentation 400 of FIG. 4, a user of a workstation (e.g., an operator of the control system 100) may identify connected linking devices 110*a-n* and/or Fieldbus devices 115*a-n*. In this regard, the user may assign the various Fieldbus devices 115*a-n* and/or perform various diagnostics associated with the control system 100.

The presentation 400 illustrated in FIG. 1 is provided by way of example only. As desired in various embodiments of the invention, a wide variety of different presentations may be generated and/or provided to a recipient system or device. These presentations may utilize a wide variety of different layouts and/or include a wide variety of different information.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for identifying Fieldbus devices within a control system, the method comprising:
   receiving, by a controller comprising one or more computers, one or more messages from one or more respective linking devices, wherein each of the one or more messages comprises information associated with a plurality of segments for the respective linking device, wherein each of the plurality of segments comprises a communications channel to which at least one Fieldbus device can be connected;
   parsing, by the controller, each of the one or more received messages to identify one or more of the plurality of segments for each respective linking device to which at least one Fieldbus device is connected;
   generating, by the controller for each of the identified one or more segments, a respective query message requesting information associated with the at least one Fieldbus device connected to the segment;
   communicating, by the controller to each of the identified one or more segments, the respective query message;
   receiving, by the controller in response to the one or more query messages, one or more respective responses, each response comprising information associated with one or more Fieldbus devices connected to the segment;
   preparing, by the controller and based upon the one or more respective responses, a listing of one or more Fieldbus devices included in the control system;
   determining a change to one or more Fieldbus devices connected to at least one of the plurality of segments, wherein the change comprises a difference between a received query response and a respective previously stored query response; and
   determining a change to at least one of the plurality of segments for a respective linking device, wherein the change comprises a difference between a received second query response and previously stored information associated with the plurality of segments.

2. The method of claim 1, further comprising:
transmitting the listing of one or more Fieldbus devices to an external computer configured to display information associated with the listing to a user.

3. The method of claim 1, further comprising:
identifying a change in the listing of one or more Fieldbus devices; and
transmitting information associated with the identified change to the external computer.

4. The method of claim 1, further comprising:
storing information associated with the one or more messages received from the one or more respective linking devices.

5. The method of claim 4, further comprising:
receiving, subsequent to storing information and from one of the one or more linking devices, a second message comprising information associated with the plurality of segments for the linking device;
comparing at least a portion of the information included in the second message to at least a portion of the stored information; and
determining, based upon the comparison, that the one or more Fieldbus devices connected to the plurality of segments for the linking device has changed.

6. The method of claim 5, further comprising:
updating the listing of one or more Fieldbus devices based upon the determination that the one or more Fieldbus devices connected to the plurality of segments for the linking device has changed.

7. The method of claim 5, further comprising:
identifying, based upon the comparison, a segment for the linking device in which a change has occurred;
communicating a second query message to the identified segment;
receiving, from the identified segment, a second response to the second query message;
comparing at least a portion of the information included in the second response to a portion of stored information for the identified segment; and
identifying, based upon the comparison, a change in the one or more Fieldbus devices connected to the segment.

8. The method of claim 4, further comprising:
determining, subsequent to storing information and based upon an identified failure to receive a second message from one of the one or more linking devices, that the linking device is no longer connected to the control system; and
updating the listing of one or more Fieldbus devices based upon the determination that the linking device is no longer connected.

9. The method of claim 1, further comprising:
generating, for each of the connected Fieldbus devices, a respective device query message;
communicating, to each of the connected Fieldbus devices, the respective device query message;
receiving, in response to the one or more device query messages, one or more respective device responses, each device response comprising information associated with a respective Fieldbus device.

10. The method of claim 9, wherein preparing a listing of one or more Fieldbus devices comprises generating a presentation of the connected Fieldbus devices based upon the received one or more device responses.

11. A control system comprising:
at least one memory operable to store computer-executable instructions;
at least one processor configured to access the at least one memory and execute the computer-executable instructions to:
receive one or more messages from one or more respective linking devices, wherein each of the one or more messages comprises information associated with a plurality of segments for the respective linking device, wherein each of the plurality of segments comprises a communications channel to which one or more Fieldbus devices can be connected;
parse each of the one or more received messages to identify one or more of the plurality of segments for each respective linking device to which at least one Fieldbus device is connected;
generate, for each of the identified one or more segments, a respective query message requesting information associated with the at least one Fieldbus device connected to the segment;
communicate, to each of the identified one or more segments, the respective query message;
receive, in response to the one or more query messages, one or more respective responses, each response comprising information associated with one or more Fieldbus devices connected to the segment; and
prepare, based upon the one or more respective responses, a listing of one or more Fieldbus devices included in the control system;
determine a change to one or more Fieldbus devices connected to at least one of the plurality of segments, wherein the change comprises a difference between a received query response and a respective previously stored query response; and
determine a change to at least one of the plurality of segments for a respective linking device, wherein the change comprises a difference between a received second query response and previously stored information associated with the plurality of segments.

12. The control system of claim 11, wherein the at least one processor is further configured to execute the computer-executable instructions to:
transmit the listing of one or more Fieldbus devices to an external computer configured to display information associated with the listing to a user.

13. The control system of claim 11, wherein the at least one processor is further configured to execute the computer-executable instructions to:
identify a change in the listing of one or more Fieldbus devices; and
transmit information associated with the identified change to the external computer.

14. The control system of claim 11, wherein the at least one processor is further configured to execute the computer-executable instructions to:
store information associated with the one or more messages received from the one or more respective linking devices.

15. The control system of claim 14, wherein the at least one processor is further configured to execute the computer-executable instructions to:
receive, subsequent to storing information and from one of the one or more linking devices, a second message comprising information associated with the plurality of segments for the linking device;
compare at least a portion of the information included in the second message to at least a portion of the stored information; and
determine, based upon the comparison, that the one or more Fieldbus devices connected to the plurality of segments for the linking device has changed.

16. The control system of claim 15, wherein the at least one processor is further configured to execute the computer-executable instructions to:
update the listing of one or more Fieldbus devices based upon the determination that the one or more Fieldbus devices connected to the plurality of segments for the linking device has changed.

17. The control system of claim 15, wherein the at least one processor is further configured to execute the computer-executable instructions to:
identify, based upon the comparison, a segment for the linking device in which a change has occurred;
communicate a second query message to the identified segment;
receive, from the identified segment, a second response to the second query message;
compare at least a portion of the information included in the second response to a portion of stored information for the identified segment; and
identify, based upon the comparison, a change in the one or more Fieldbus devices connected to the segment.

18. The control system of claim 14, wherein the at least one processor is further configured to execute the computer-executable instructions to:
determine, subsequent to storing information and based upon an identified failure to receive a second message from one of the one or more linking devices, that the linking device is no longer connected to the control system; and
update the listing of one or more Fieldbus devices based upon the determination that the linking device is no longer connected.

19. The control system of claim 11, wherein the at least one processor is further configured to execute the computer-executable instructions to:
generate, for each of the connected Fieldbus devices, a respective device query message;

communicate, to each of the connected Fieldbus devices, the respective device query message;

receive, in response to the one or more device query messages, one or more respective device responses, each device response comprising information associated with a respective Fieldbus device.

20. The control system of claim 19, the listing of one or more Fieldbus devices comprises a presentation of the connected Fieldbus devices that is based upon the received one or more device responses.

* * * * *